March 26, 1946.         J. B. GLENNON ET AL         2,397,137
               MAGNETIC CONTROLLING DEVICE
                 Filed June 25, 1941           6 Sheets-Sheet 1

INVENTORS
J.B. GLENNON
W.R. MALTBY
A.H. SELLMAN
ATTORNEY

March 26, 1946.  J. B. GLENNON ET AL  2,397,137
MAGNETIC CONTROLLING DEVICE
Filed June 25, 1941   6 Sheets-Sheet 6

INVENTORS
J. B. GLENNON
W. R. MALTBY
A. H. SELLMAN
BY
ATTORNEY

Patented Mar. 26, 1946

2,397,137

UNITED STATES PATENT OFFICE 2,397,137

MAGNETIC CONTROLLING DEVICE

James B. Glennon, Albert H. Sellman, and Wilson R. Maltby, Washington, D. C.

Application June 25, 1941, Serial No. 399,668

15 Claims. (Cl. 177—385)

(Granted under the act of March 3, 1883, as amended April 30, 1928; 370 O. G. 757)

This invention relates to improvements in magnetic controlling devices, and is adapted for use in connection with submarine mines, indicating mechanism for sweeping tests of ships at sea, and indicating mechanism for the coast defense wherein a magnetic switch is actuated under or by the magnetic attraction or influence of a mass of steel or iron, such as that contained in the structure of a vessel approaching or passing the device, thereby to close an electrical circuit and operate an indicating mechanism or ignite an explosive. More specifically the magnetic controlling device comprises a magnetized element or needle pivotally mounted for rotation in both a horizontal and a vertical plane but normally held substantially horizontal by the influence of a small permanent magnet adjustably mounted adjacent the element.

It may be stated that the lines of force comprising the earth's magnetic field are perpendicular to the surface of the earth at the north and south magnetic poles, parallel to the surface of the earth at the magnetic equator and at an angle with the earth's surface at locations intermediate the Equator and the poles depending on the latitude of the location. If a balanced magnetic needle be pivoted for rotation in both a horizontal and a vertical plane, the needle will be parallel to the earth's magnetic field and point generally in a north and south direction and at an angle of inclination to the earth's surface depending upon the latitude in which the needle is placed, hereinafter referred to as the angle of inclination or dip of the needle.

It has been found that within the vicinity of a steel ship or vessel the lines of force of the earth's magnetic field are so distorted that the intensity of the earth's magnetic field is altered. If such a ship passes over or in the vicinity of a submarine mine or indicating mechanism having a magnetic dip needle therein, the angle of dip of the needle would vary with the degree of distortion of the earth's magnetic field in accordance with the position of the ship or vessel relative to the device.

In the system of the present invention, the magnetic needle or element is yieldably set to a horizontal position by the influence of a small permanent magnet with axis vertical mounted preferably above the magnetic needle and provided with an adjusting mechanism whereby the position of the permanent magnet may be varied at will to set the magnetic needle element yieldably in a predetermined horizontal position in accordance with the latitude in which the control device is to be used.

When a predetermined change occurs in the earth's magnetic field adjacent the pivoted magnetic needle, the needle is tilted either upward or downward from the horizontal position, thereby bringing a contact member into circuit closing position to operate an indicator or detonate a mine, as the case may be, this predetermined change in the earth's magnetic field necesssary to cause the movement of the contact member into circuit closing position being referred to hereinafter as the sensitivity or sensitivity setting of the device.

One of the objects of the present invention is to provide a new and improved magnetic influence device of simple and rugged construction which will be economical to manufacture and possess the desired qualities of reliability and efficiency in use and operation.

Another object is to provide a new and improved magnetic response device which, when used as the trigger mechanism of a mine, is adapted to withstand rough handling of transportation and planting, without injuring or changing in any way the adjustment and magnetic or mechanical balance of any of its component parts.

Another object is the provision of new and improved means for indicating the effectiveness of mine sweeping operations.

A further object of the invention is the provision of a magnetic device responsive to variations in the vertical component of the magnetic field adjacent thereto for indicating at a distance the degree of distortion of the earth's magnetic field caused by the presence of a magnetic body, such as a steel vessel within the vicinity of the device.

A still further object of the invention is the provision of new and improved means for firing a mine by a predetermined change in the vertical component of the earth's magnetic field adjacent the mine and in which means are provided for making a sensitivity adjustment prior to launching the mine thereby to compensate for the latitude of the location within which the mine is laid.

Other objects and advantages will be apparent from the following detailed description, taken in connection with the accompanying drawings, of which:

Fig. 5 is a view, somewhat enlarged and partly in section of the device of Fig. 3 with the cover in position;

Figures 1, 2:
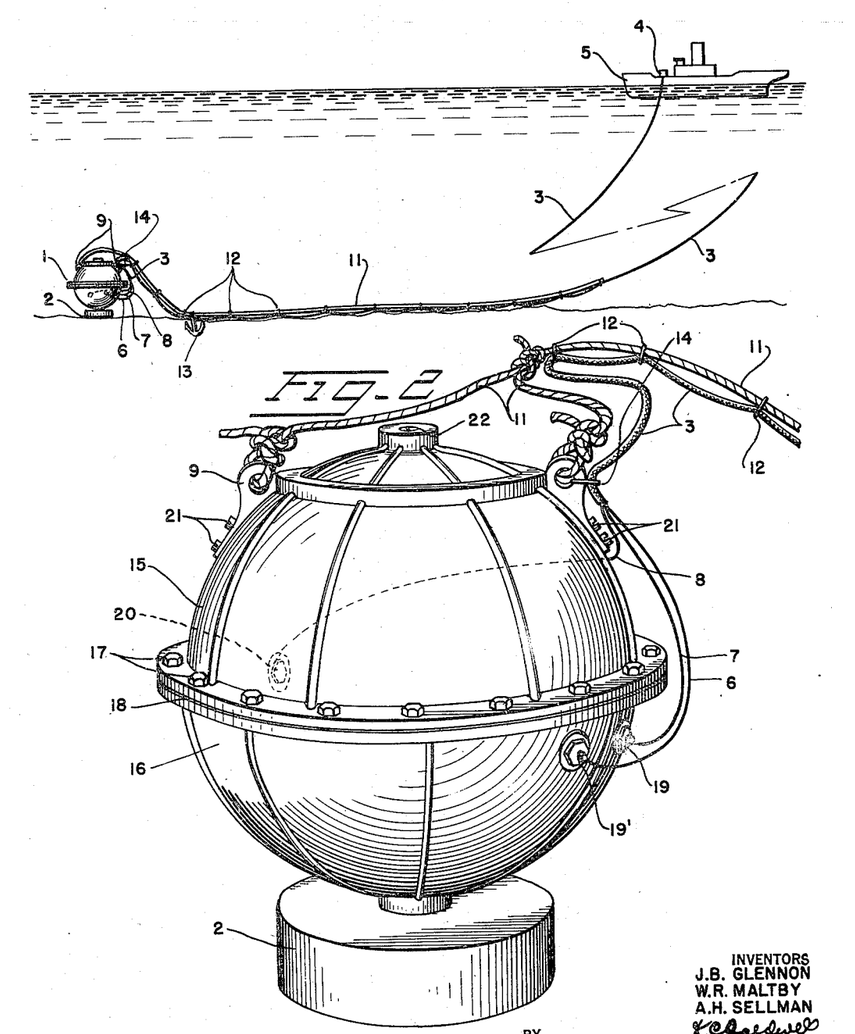
Fig. 1 is a diagrammatic view illustrating the device according to one of the forms of the invention.
Fig. 2 is a view, in perspective somewhat enlarged of the magnetic controlling device of Fig. 1.

Referring to the accompanying drawings on which like numerals of reference are employed to designate like parts, and more particularly to Fig. 1, the numeral 1 is employed to designate generally the magnetic controlling device held in contact with the bed of a body of water by the weight 2 secured to the lower side thereof and having a length of electric cable 3 extending to the indicating apparatus 4, located at an observation station, such as the ship 5. The cable 3 comprises three insulated electrical conductors 6, 7, and 8 by means of which signal indications occurring within the device 1 in response to changes in the earth's magnetic field adjacent the device cause the electro-responsive apparatus 4 to give an indication of the degree and direction of change in the magnetic field produced by the influence of a steel vessel within the vicinity of the device or by a field produced by the operation of mine sweeping apparatus.

Secured to the magnetic controlling device as at the lugs 9 thereof is a rope 11 attached in any suitable manner at numerous points as at 12 to the cable 3 to which is attached a small anchor 13 to hold the rope and cable fast to the bed of the body of water, the rope extending beyond the anchor in the direction toward the observing station for a distance somewhat greater than the depth of the water within which the device is submerged whereby the anchor and device may be lowered and raised at will from the water without exerting a mechanical strain on the electric cable. The cable 3 is preferably secured to the device 1 as at 14, sufficient slack being provided in the cable between the device and the rope to prevent injury to the cable as the device is lowered and raised by the rope 11.

The electrical energy required for the operation of the indicating apparatus is obtained from a battery or generator located preferably at the observation station.

The magnetic controlling device is enclosed within a water tight casing comprising an upper portion 15, Fig. 2, secured to a lower portion 16 as by the bolts 17, a gasket 18 of lead or other suitable material being inserted preferably between the upper and lower casings to provide a water tight joint and hermetically seal the device. When employed as a firing indicator or magnetic detector in the manner of Fig. 1, a weight 2 of heavy metal such as lead or brass is attached to the lower part of the casing in any suitable manner as by screws or bolts to cause the device to sink and come to rest on the bed of the body of water whereas, when employed as a trigger mechanism for a mine, the weight 2 is not required and may, if desired, be omitted. The casing 16 is also provided with three terminal connections 19, 19' and 20 suitably insulated from each other and from the casing of the device by means of which the circuits from the conductors 6, 7 and 8 of the cable 3 are extended within the device.

Whereas two lugs 9 shown attached to the casing 15 as by the screws 21 are provided for raising and lowering the device when employed as a sweep firing or vessel detector, it will be understood that, when employed as a mine firing device, these lugs will not be required and may, if desired, be removed. The casing is substantially filled with a copious quantity of non-corrosive, non-freezing liquid such as kerosene or the like, a removable screw or plug 22 being provided within the casing 15 for this purpose.

Figure 4:
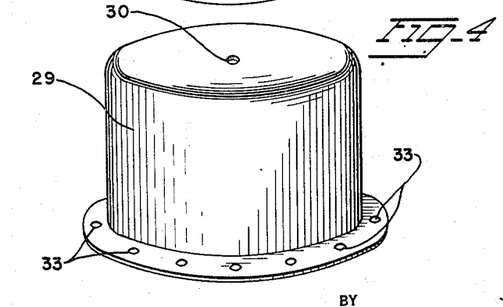
Fig. 4 is a view of the cover for the device of Fig. 3.

Pivotally supported within the casing 16 is the gimbal ring 23 having the bearings 24 and 25 which cooperate with the arms 26 and 27 respectively of the pot 28 whereby the pot is suspended by gimbals. The pot is enclosed by the cover 29, Figs. 4 and 5 having a vent 30 in the upper portion thereof and held to the pot by suitable bolts 31 inserted into the holes 32 and 33 within the pot and cover respectively and drawn up tightly by means of nuts threaded on the bolts. The pot is provided preferably with a weight 34 of heavy metal such as lead secured within the pot at the lower portion thereof, Fig. 5, as by the screw 35 and nut 36 thereby to maintain the pot in an upright position within the gimbals.

Figure 6:
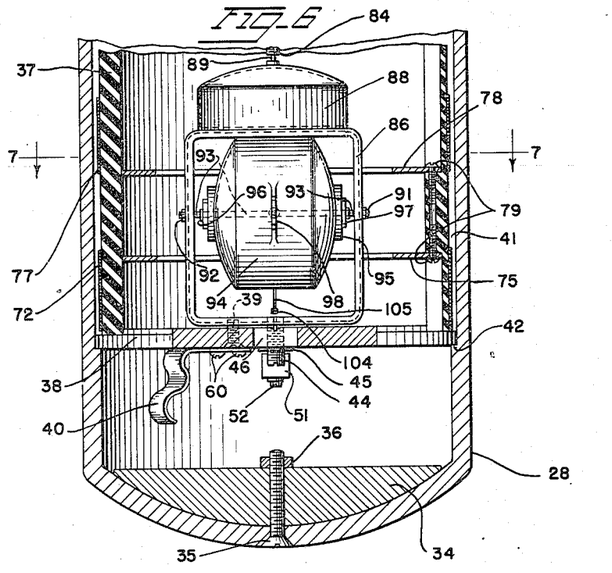
Fig. 6 is a view, taken substantially along the line 6—6 of Fig. 5.
Figure 7:
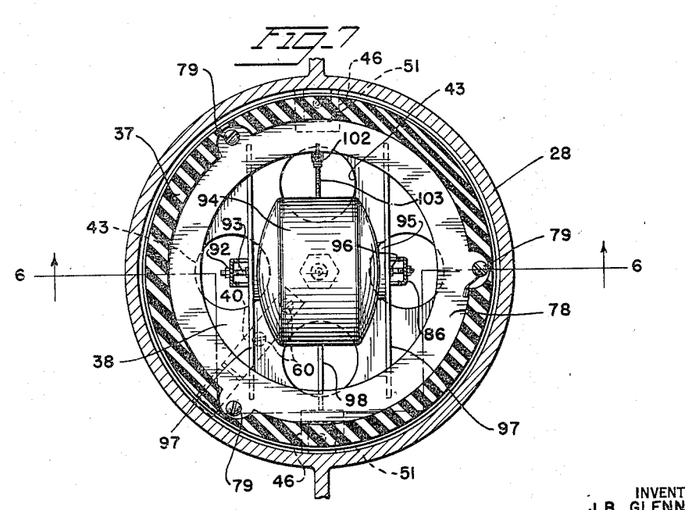
Fig. 7 is a view, taken substantially along the line 7—7 of Fig. 5.

The magnetic controlling device supported by the pot will now be described. Referring to Figs. 5, 6 and 7 of the drawings there is shown thereon a tube of non-magnetic material 37 such, for example, as Bakelite having a circular plate 38 slightly larger in diameter than the tube and fastened to the lower end thereof as by the screws 39 and adapted to be inserted within the portion 41 of the pot until arrested by the shoulder 42. The plate is provided preferably with a plurality of apertures 43 to facilitate the inspection of the interior mechanism of the controlling device and a tapped hole in the central portion thereof in which is fitted the bearing screw 44 held in the adjusted position by the nut 45. The plate 38 is also provided with a contact spring 40 attached thereto as by the screws 60 and formed in such a manner as to make electrical contact with the pot, the plate also having two cut away portions 46 within which the screw terminals 47 extend and make electrical contact with the contact members 48 thereby compressing the springs 49 resting against the studs 51 through which the contact members 48 extend. Means such as the nuts 52 are provided to limit the upward movement of the contact members when the magnetic contact device is removed from the pot.

Figure 3:
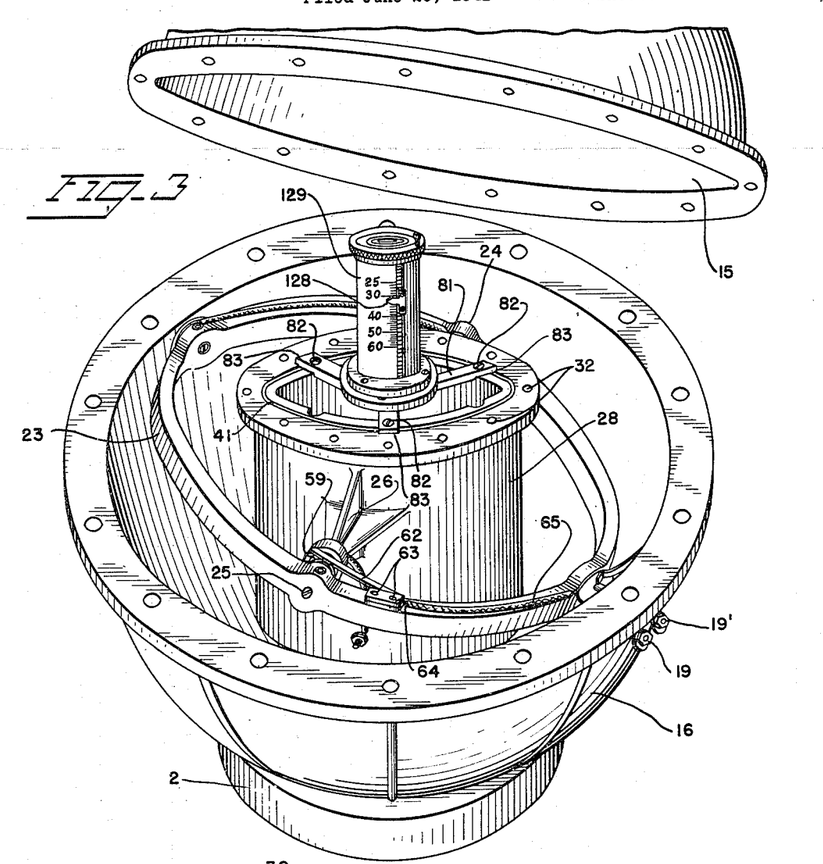
Fig. 3 is a view in perspective of the device of Figs. 1 and 2 with the upper casing and cover removed.

The studs 51 extend through the pot and are electrically insulated therefrom as by the insulating bushings 53 and are threaded on the outer end thereof to receive the nuts 54 by means of which the terminals 55 and 56 attached to the conductors 57 and 58 respectively are made secure to the studs 51. The conductor 57 is connected to a metallic slip ring 59 supported by the arm 27 and insulated therefrom by the insulating bushing 61. A contact spring 62 secured to the gimbal ring as by the screws 63, Fig. 3, and insulated therefrom by the insulating strips 64, is in electrical engagement with the slip ring 59 and the conductor 65, the circuit extending therefrom by way of another insulated slip ring on the gimbal ring and contact brush to the terminal 19'.

In a similar manner the conductor 58 is connected by way of the insulated bearing shaft 66 and metallic insert 67 to the conductor 68 and thence by way of another insulated slip ring on the gimbals to the insulated terminal 20. The terminal 19, it will be noted, is insulated from the casing 16 but in electrical circuit with the gimbal ring 23 from whence the circuit connection is continued by way of the bearing shaft 69 secured thereto as by the screw 70, bearing 71 and arm 27 to the pot.

A coil of wire 72 has the end 73 thereof in electrical connection with the screw terminal 47 and the other end 74 thereof connected to the contact ring 75 by the screw 76. In a similar manner one end of the coil of wire 77 is connected to the other of the screws 47 and at the other end to the contact ring 78. The inner side of the tube 37 is cut away as shown on Figs. 5, 6, and 7 to receive three lugs or tabs formed on the contact rings 75 and 78 whereby the contact rings are securely held in spaced relation parallel to each other and normal to the axis of the tube by the screws 79 threaded into the tube 37.

A spiderlike plate 81 is secured to the top of the tube 37 by the screws 82 and provided with arms adapted to set within complementary recessed portions 83 of the pot thereby to guide and align the tube within the pot 28 such that the axis of the tube coincides or is parallel with the axis of the pot and the screw terminals 47 are in engagement with the contact members 48. A bearing screw 84 is threaded in the central portion of the plate 81 and provided with a nut 85 by means of which the screw is held firmly in the adjusted position.

An apertured supporting frame 86 is provided at the lower end thereof with a pivot bearing 87 adapted to engage and rotate freely on the bearing screw 84, the upper portion of the frame being securely attached to a hollow metallic float 88 of non-magnetic material such, for example as brass, in a suitable manner as by brazing or soldering the parts together. The upper part of the float is provided with a pivot support 89 at the center thereof adapted to engage and rotate freely on the bearing screw 84. From the foregoing it will be apparent that the frame 86 and float 88 are pivotally mounted for rotation in a horizontal plane about the bearing supports 84 and 44, the float 88 being of sufficient size and buoyancy to reduce the friction of the bearings 87 and 89 to a minimum when the pot 28 is filled with liquid.

The frame 86 has mounted therein the pivot screws 91 held in locked position to the frame by the nuts 92 for pivotally mounting a shaft 93 passing through and sealed to a non-magnetic metallic float 94 as by the bushings 95 secured thereto in any suitable manner as by soldering or brazing the parts together. The bushings are provided with a sleeve portion 96 adapted to support the tapered magnetized bars or needles 97, hereinafter referred to as the magnetic element, by means of an aperture provided therein whereby the needles are rigidly held attached to the float 94 and parallel to each other. A contact member 98 is secured to the float as by soldering or brazing the parts together such that the contact member is in substantial alignment with the magnetized bars. The member 98 is provided preferably with contact points 99 and 101 adapted to engage the contact rings 75 and 78 respectively as the magnetic element is moved or tilted from the horizontal position to the indicating or firing position by a change in the magnetic field adjacent thereto. The float 94 is of sufficient size and buoyancy to reduce the friction between the bearings 91 and the shaft 93 to a minimum when the pot is filled with liquid.

An adjustable weight 102 threaded on the stud 103 secured to the float 94 is provided for compensating for the weight of the contact member 98 whereby the magnetic unit may be adjusted to a predetermined balanced condition. There is also provided an adjustable weight 104 threaded on the stud 105 projecting from the lower portion of the float 94 by means of which the speed of response of the magnetic element to a predetermined change in the magnetic field adjacent thereto may be varied at will in accordance with the set position of the weight on the stud 105. From the foregoing description it will be apparent that the magnetic element is pivotally mounted for rotation in both a vertical and a horizontal plane and adapted to close an electrical circuit regardless of the azimuth position of the device when the magnetic element has been moved by a predetermined change in the earth's magnetic field adjacent the element either upwardly or downwardly, as the case may be, into contact closing position.

As heretofore stated, the angle between the lines of force comprising the earth's magnetic field and the surface of the earth varies in accordance with the latitude of the location. The means employed for compensating for the latitude of the location in which the device is used and for yieldably setting the magnetic element in a horizontal position intermediate the contact rings 75 and 78 will now be described.

Secured to the plate 81 as by the screws 106 is a circular disc 107 having an aperture therein to receive and support the guide 125 and to which is affixed as by the screws 108 the flanged portion 109 of the hollow cylindrical support 111 having a projecting flanged portion 112 at the upper portion thereof. A slot 113 is provided in the cylindrical support 111 within which is slideably disposed a threaded member 114 in engagement with a rotatable screw 115 disposed within the support and movable to different positions in accordance with the movement of the screw. The screw 115 is provided with a shoulder 116 at the upper end thereof in abutting relation with the flanged portion 112 of the cylindrical support, a sleeve portion 117 being provided for rotatably supporting the screw within the support 111. The screw is in rigid connection with the member 118 as by the screw 119 whereby the screw may be rotated at will in either direction and locked as by the screw 121 in a predetermined setting.

The inner portion of the screw 115 is provided with a screw thread having preferably the same pitch as the outer thread of the screw in threaded engagement with the follower 122 which is prevented from rotation by the portions 123 and 124 which extend through a suitable slot within the tubular guide piece 125 secured to the plate 107. The portions 123 and 124 are formed to support a permanent magnet 126 and move the permanent magnet upward or downward in accordance with the direction of movement of the screw 115, the movement of the magnet being accompanied by a corresponding movement of the threaded member 114. Affixed to the member 114 as by the screws 127 is the indicator or pointer 128 which cooperates with a suitable scale 129 such, for example, as the scale shown on Fig. 3 whereby any desired setting of the magnet 126 may be made in accordance with the intensity of the vertical component of the earth's magnetic field at the location in which the device is to be placed. In practice the normal vertical component of the earth's magnetic field for any desired location may be ascertained by reference to a suitable map such, for example, as map 1702 published by the Hydrographic Office, Washington, D. C., and the magnet 126 given a setting by the means provided whereby the magnetic needle element will be yieldably set in a horizontal position when placed at the desired location.

Figure 8:
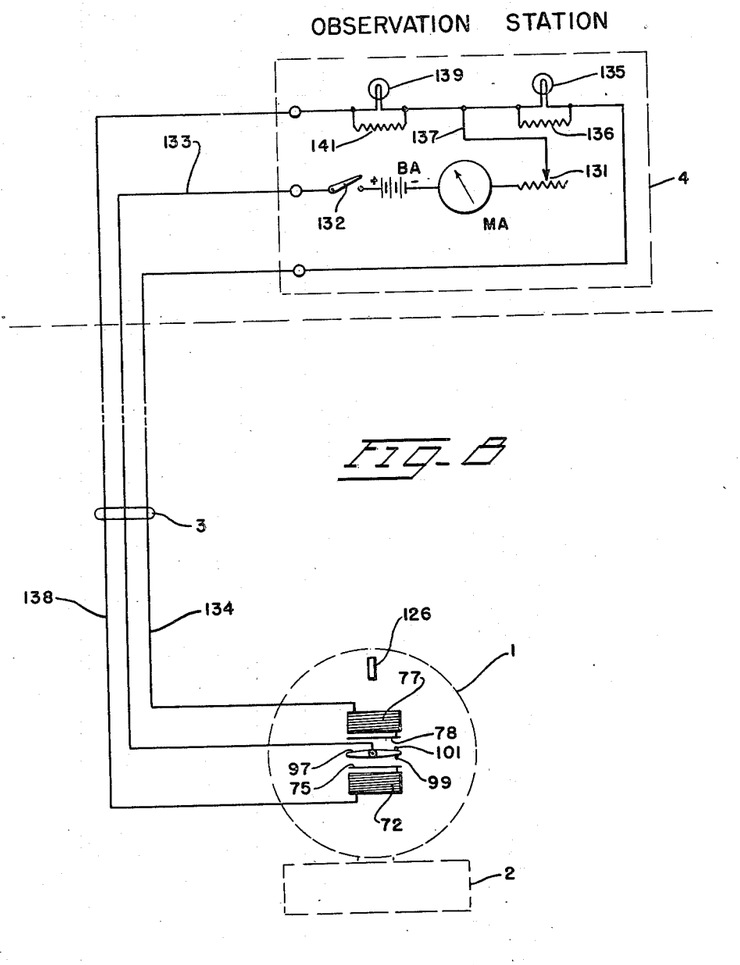
Fig. 8 illustrates diagrammatically an electrical circuit arrangement suitable for use with the system of Fig. 1.

The operation of the device as a magnetic indicator will best be understood by reference to Fig. 8 of the drawings on which is shown an indicating mechanism 4 located at an observation station such, for example, as the ship 5 of Fig. 1 or a suitable station on the shore and connected to the magnetic controlling device 1 by the electric cable 3, the magnetic device 1 resting on the bed of a body of water by reason of the weight 2 attached thereto. It will of course be understood that the device has been supplied with a sufficient amount of suitable fluid and the permanent magnet 126 thereof has been adjusted to the latitude of the location in which the device has been placed whereby the magnetic element 97 of the device is yieldably set to a horizontal position with the contacts 99 and 101 thereof disengaged from the contact rings 75 and 76 respectively. The operator or attendant adjusts the variable resistance 131 in accordance with the length of the cable 3 and the strength of the battery BA and closes the switch 132. The system of Fig. 8 is now in readiness to indicate the presence of a steel vessel or the magnetic effect of mine sweeping operations within the vicinity of the device 1.

When a change occurs in the earth's magnetic field of the required direction and of sufficient degree to cause the magnetic element to be tilted such that contact 101 is brought into electrical contact with the contact ring 76, a circuit is closed from the positive pole of battery BA, switch 132, conductor 133 of cable 3, contact 101, and contact ring 76, holding coil 77, conductor 134 of cable 3, signal 135 and resistance 136 in parallel, conductor 137, variable resistance 131, milliammeter MA and thence to the negative pole of battery BA, thereby energizing the hold on coil 77 and operating the signal 135 at the observation station. An indication is thus given at the observation station whereby the attendant thereat is apprized of the presence of a steel vessel or the effectiveness of mine sweeping operations as the case may be, within the vicinity of the magnetic device 1. The energization of the coil 77 sets up an electro-magnetic field about the magnetized needle 97 of a polarity to cause the contact 101 to remain in engagement with the contact ring 76 and the signal 135 to remain operated until the circuit is interrupted by the attendant opening the switch 132. Whereas in the embodiment of the invention shown on Fig. 8, the signal 135 is shown as a lamp, it will be understood that this is by way of illustration only as any electro-responsive device suitable for the purpose may be employed.

When a change of the earth's magnetic field occurs in the opposite direction of sufficient magnitude to tilt the magnetic element sufficiently to bring the contact 99 into engagement with the contact ring 75, as may result, for example, from the magnetic field of a passing vessel or from certain types of mine sweeping operations, a circuit is closed from the positive pole of battery BA, switch 132, conductor 133 of cable 3, contact 99, contact ring 75, winding of hold on coil 72, conductor 138 of cable 3, signal device 139 and resistance 141 in parallel, conductor 137, variable resistance 131, milliammeter MA and thence to the negative pole of battery BA thereby operating the signal 139 and maintaining the contact 99 in engagement with the contact ring 75 by energization of the coil 72. The signal 139 is thus held operated until the circuit is interrupted by the attendant at the contacts of switch 132. The resistances 141 and 136 are provided preferably to enable the coils 72 and 77 to receive more current than the signal devices 139 and 135 thereby to insure more positive electrical engagement between the contacts 99 and 101 and their respective contact rings and greater reliability in the operation of the device.

The setting of the variable resistance 131 may be made, if desired, after the cable 3 has been connected to the magnetic device 1 by bringing a permanent magnet near the magnetic element thereby to tilt the element sufficiently to close the contacts thereof before the device is submerged within the body of water. By holding first one and then the other end of the magnet above the element 97, for example, the attendant may test both signals 135 and 139, each of the signals being released, as will be understood, by the movement of the switch 132 to open position.

Figure 9:
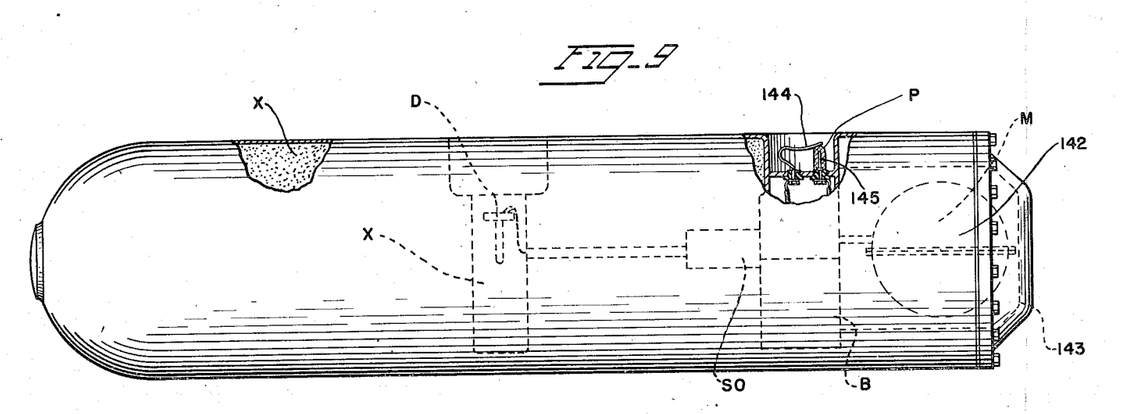
Fig. 9 is a view of a mine employing the magnetic controlling device of the present invention.

When used as a firing mechanism for a mine, the arrangement of Fig. 9 may be employed in which the magnetic controlling device M is disposed within the casing 142 of a mine adapted to be laid on the bed of a body of water, a suitable protective pad or cushion of rubber 143 preferably being placed between the device and the casing 142 to absorb the shock of impact and prevent injury to the device as the mine is launched. The mine is provided with a battery B having one pole thereof in circuit with a switch controlled by a water soluble plug P and the other pole in circuit with a slow operating relay SO, the circuit to the relay including the magnetic device M. The mine is also provided with an explosive charge X adapted to be fired by the detonator D as the relay operates.

Figure 10:
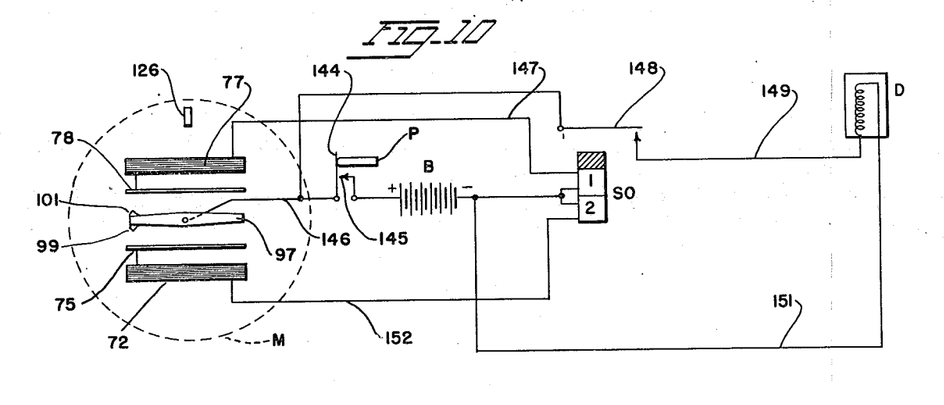
Fig. 10 illustrates diagrammatically an electrical circuit arrangement suitable for use with the mine of Fig. 9.

The operation of the mine will best be understood by reference to Fig. 10 of the drawings on which is shown, among other elements, a slow operating relay SO having two operating windings thereon and provided with an armature 146 adapted to close its contact and operate the detonating device D as the relay operates.

Assume, by way of example, that the device M has been set by the adjustable magnet 126 such that the magnetic element 97 thereof is in a horizontal position midway between the contact rings and that the mine has just been launched. The contact spring 144 is normally held disengaged from the contact 145 before immersion of the mine by a plug or stopper P consisting of a material soluble in water, such for example as a compound consisting of sugar, glue, glycerin or similar materials. This plug effectually maintains the contact spring 144 normally disengaged from the contact 145 until after the mine shall have been submerged for a sufficient length of time to allow the soluble plug to become dissolved or softened sufficiently by the action of the water to allow the spring 144 to move into electrical engagement with the contact 145. By reason of the normally disengaged condition of the contact elements 144 and 145 there will be no possibility of prematurely exploding the mine in handling or in transporting or in launching the same, the firing mechanism being disarmed and rendered entirely incapable of acting to explode the mine until a period of time has elapsed after the mine shall have been launched. With the contact spring 144 in engagement with the contact 145 the mine is now in an armed condition.

In the event of the approach of a steel vessel of sufficient size to cause the magnetic element 97 to be moved into the firing position with contact 101 thereof in electrical engagement with the contact ring 76, a circuit is closed from the positive pole of battery B, contact 145 and contact spring 144, conductor 146, contact 101 and contact ring 76, winding of hold on coil 77, conductor 147, winding 1 of relay SO and thence to the negative pole of battery B thereby energizing winding 1 of the slow operating relay SO and the hold on coil 77. The operation of relay SO at armature 148 thereof completes a circuit from the positive pole of battery B, contact 145 and contact spring 144, conductor 146, armature 148 and make contact of relay SO, conductor 149, detonator D, conductor 151 and thence to the negative pole of battery B thereby operating the detonator and exploding the mine.

Should the effect of a local field of the approaching steel vessel acquired by reason of certain magnetic properties imparted thereto during the fabrication of the vessel or thereafter, be of a polarity and of sufficient intensity to cause the magnetic element 97 to be moved or tilted sufficiently to bring contact 99 into electrical engagement with contact ring 75, a circuit is closed from the positive pole of battery B, contact 145 and spring 144, conductor 146, contact 99 and contact ring 75, winding of the hold on coil 72, conductor 152, winding 2 of relay SO and thence to the negative pole of battery B, thereby operating relay SO and causing the mine to be fired by the detonator D.

If, in response to the sudden application of a wave of hydrostatic pressure to the mine as may be caused, for example, by countermining, the magnetic element should be forcibly jarred into circuit closing position, the rebound of the contact 99 or 101, as the case may be, against its contact ring is sufficient to interrupt the circuit to the associated hold on coil whereby the magnetic element is allowed to resume its armed setting and the relay SO receives a momentary flow of current for a length of time insufficient to cause the relay to operate. The detonator D is thus prevented from operating and the mine is not exploded by the countermining operation. Furthermore, the mine is not subject to detonation by mine sweeping operations of the type wherein a strong magnetic field is suddenly applied to a sweep wire for short periods of time for the reason that the rebound of the magnetic element against either of its contact rings interrupts the circuit to the slow operating relay SO before armature 148 thereof is moved into circuit closing position. Whereas in the embodiment of the invention shown in Fig. 10 of the drawings, a slow operating relay having two windings has been illustrated, various other electro-responsive time delay devices and instrumentalities may be employed such, for example, as a relay with a single winding, escapement mechanisms, dash pot devices and the like. In the event that a relay with a single winding is employed, the conductors 147 and 152 extending from the hold on coils 77 and 72 respectively may be connected together and to one end of the winding of the relay.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is our intention therefore to cover in the appended claims all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a magnetic responsive device, a pivoted magnetic element selectively responsive to changes in the magnetic field adjacent thereto, means for pivotally mounting said magnetic element for rotation in a vertical plane, means including an adjustable magnet arranged with the axis thereof vertical and intersecting the axis of rotation of said magnetic element for yieldably setting the magnetic element in a predetermined position, a circuit closing member operatively connected to said magnetic element, and means including a pair of fixed contact devices adapted to be engaged selectively by said circuit closing member as the magnetic element is rotated vertically in either direction from said predetermined position by a predetermined change in said magnetic field.

2. A magnetic device of the character disclosed having a magnetic element selectively responsive to changes in the earth's magnetic field adjacent thereto, means including a plurality of pivot supports for mounting said magnetic element for rotation in a vertical plane about a horizontal axis and for rotation in a horizontal plane about a vertical axis with the horizontal and vertical axes in intersecting relation with each other, a pair of fixed annular contact devices disposed on opposite sides of said magnetic element concentric with said vertical axis and normal thereto, contact means operatively connected to the magnetic element and rotatable therewith, and means including a permanent magnet in alignment with said vertical axis and settable at will for yieldably setting said magnetic element to a position wherein the contact means is brought into operative engagement selectively with said contact devices as the magnetic element is subsequently moved in a vertical direction by a predetermined change in said magnetic field.

3. In a magnetic responsive device, a pivoted magnetic element selectively responsive to changes in the earth's magnetic field adjacent thereto, means including a plurality of pairs of trunnions for pivotally mounting said magnetic element for rotation in a vertical and in a horizontal plane, means including an adjustable permanent magnet settable at will to different positions for yieldably setting the magnetic element to a predetermined position, a contact member operatively connected to and rotatable with said magnetic element, and a fixed annular contact device adapted to be engaged by said contact member when the magnetic element has been rotated vertically from said predetermined position by a predetermined increase in said magnetic field.

4. In a magnetic responsive device, a pivoted magnetic element selectively responsive to changes in the earth's magnetic field adjacent thereto, means including a plurality of pairs of trunnions for pivotally mounting said magnetic element for rotation in a vertical and in a horizontal plane, means including an adjustable permanent magnet settable at will to different positions for yieldably setting the magnetic element to a predetermined position, a contact member operatively connected to and rotatable with said magnetic element, and a fixed annular contact device adapted to be engaged by said contact member when the magnetic element has been rotated vertically from said predetermind position by a predetermined decrease in said magnetic field.

5. In a magnetic responsive device of the character disclosed adapted to rest on the bed of a body of water, a pivoted magnetic element selectively responsive to changes in the magnetic field adjacent thereto, means including a plurality of trunnions for mounting said magnetic element for rotation in a vertical and in a horizontal plane, means including a permanent magnet settable at will for yieldably setting the magnetic element to an initial position, a fixed annular contact member disposed concentric with the vertical axis of rotation of the magnetic element, contact means operatively connected to said magnetic element and adapted to engage said annular contact member as the magnetic element is moved from said initial position by a predetermined change in said magnetic field, and means including a solenoid controlled by said contact means for setting up an electro-magnetic field adjacent the magnetic element for maintaining the contact means in continuous engagement with the annular member.

6. In a magnetic responsive device of the character disclosed, the combination of a pivoted magnetic unit selectively responsive to changes in the magnetic field adjacent thereto, means including a trunnion for pivotally mounting said magnetic unit for rotation in a vertical plane, a fluid in which said unit is immersed, a buoyancy member secured to the magnetic unit and rotatable therewith, said buoyancy member being adapted to reduce the friction of said trunnion, a contact member associated with said buoyancy member, a plurality of fixed annular contact devices adapted to be engaged selectively by said contact member as the magnetic unit is rotated to a predetermined position, and means operatively connected to the buoyancy member for varying the rate of response of said magnetic unit to a predetermined change in said magnetic field.

7. In a magnetic responsive device of the character disclosed, the combination of a sensing mechanism, a magnetic unit within said mechanism selectively responsive to changes in the magnetic field adjacent thereto, means including a plurality of horizontally arranged pivots for mounting said magnetic unit for rotation in a vertical plane, a pair of contact devices secured to said mounting means, means associated with the magnetic unit for selectively engaging said contact devices in accordance with the direction of rotation of the magnetic unit, a buoyancy member secured to the magnetic unit and rotatable therewith, said buoyancy member being adapted to reduce the friction of said pivots, a casing for said sensing mechanism having a fluid therein within which said buoyancy member is adapted to be immersed, means for detachably mounting said sensing mechanism within the casing, and means including a plurality of detachable contact elements associated with said mounting means for establishing a plurality of circuit connections to the magnetic unit and the contact devices when the sensing mechanism is mounted within said casing.

8. In a magnetic responsive device, a pivoted magnetic element selectively responsive to changes in the magnetic field adjacent thereto, means for pivotally mounting said magnetic element for rotation in a vertical plane, a permanent magnet arranged with the axis thereof vertical and intersecting the axis of rotation of said magnetic element, means settable at will for adjusting the position of said permanent magnet by vertical movement of the magnet along its axis thereby to set said element yieldably in a horizontal position, and means operatively connected to said magnetic element for closing a circuit when the magnetic element has been rotated vertically in either direction from said horizontal position by a predetermined change in said magnetic field.

9. In a magnetic responsive device, a pivoted magnetic element selectively responsive to changes in the vertical component of the earth's magnetic field adjacent thereto and settable to a plurality of positions including an initial position and a circuit closing position, means including a permanent magnet adjustable at will for setting the magnetic element yieldably to said initial position, contact means adapted to be closed as the magnetic element is moved from said initial position to said circuit closing position by a predetermined change in said magnetic field, and means settable at will for adjusting the speed of response of the magnetic element to said predetermined change in the magnetic field.

10. In a magnetic responsive device of the character disclosed arranged within a magnetic field, the combination of a pivoted magnetic unit comprising two parallel magnetic bars in fixed space relation with respect to each other, means including a rotatable shaft for pivotally mounting said magnetic bars for rotation in a vertical plane, means for yieldably setting said bars in an initial horizontal position, a cylindrical float arranged on said shaft intermediate the magnetic bars and connected thereto with the axis of the float coinciding with the axis of said shaft, said float being adapted to reduce the friction of said pivotally mounting means as the shaft rotates, a fluid in which said magnetic unit is immersed, a pair of contact devices respectively arranged within said fluid on one end of each of said magnetic bars, a rotatable support having an aperture therein within which said magnetic bars and float are disposed, means for pivotally mounting said support for rotation in a horizontal plane, a pair of annular contact members, each of said contact members being arranged in a horizontal plane and having an aperture within which the support is adapted to rotate, and means for causing said contact members to be engaged selectively by said contact devices regardless of the azimuth position of the contact members when the magnetic bars have been moved in either direction in said vertical plane through a predetermined distance from said initial horizontal position thereof by a change in said magnetic field.

11. A magnetic responsive device of the character disclosed comprising two parallel magnetic bars adapted to respond to changes in the magnetic field adjacent thereto, means including a shaft for maintaining said bars in continuous fixed engagement with each other, means for supporting said shaft and bars rotatably about a horizontal axis, a cylindrical buoyancy device arranged on said shaft intermediate said pair of magnetic bars with the axis of the buoyancy device concentric with said shaft, a fluid in which said buoyancy device is immersed, a frame having upper and lower laterally extending portions respectively and vertically extending portions within which said buoyancy device is arranged, a float secured to the upper lateral portion of said frame and arranged within said fluid, a pair of bearing supports secured to the upper portion of said float and said lower lateral portion of the frame respectively for pivotally mounting the float and frame for rotation about a vertical axis, means secured to the vertically extending portions of said frame for pivotally mounting said shaft for rotation about said horizontal axis in intersecting relation with said vertical axis, means secured to said buoyancy device and settable at will adapted to effect a mechanical balance of said magnetic bars and buoyancy device about said horizontal axis, means including a permanent magnet arranged concentric with said vertical axis and settable at will to different positions for compensating for the angle of inclination of the earth's magnetic field adjacent the device whereby the magnetic bars are yieldably supported in a horizontal position, a pair of annular contacts arranged coaxially with said vertical axis and adapted to be engaged selectively by said magnetic bars when the bars have moved about said horizontal axis a predetermined distance in either direction from said horizontal position, and means secured to said buoyancy device and settable at will for varying the rate of response of said magnetic bars to a predetermined change in the vertical component of said magnetic field.

12. In a magnetic responsive device of the character disclosed, in combination, a cylindrical casing, a tube of non-magnetic material slideably arranged within said casing, a coil of wire arranged about said tube at the upper portion thereof, a second coil of wire arranged about said tube at the lower portion thereof, a pair of circular plates respectively secured to each of the ends of said tube, a pair of pivot screws respectively arranged in the center of each of said plates, a rotatable frame having a float secured to the upper portion thereof supported by said pivot screws for rotation about a vertical axis, a shaft supported by said frame adapted to rotate about a horizontal axis, a circular buoyancy member arranged on said shaft coaxially therewith, a pair of parallel magnetized bars secured to said shaft on opposite sides of said buoyancy member, a copious supply of fluid within said casing sufficient to submerge said float and buoyancy device, a pair of circular contact devices in electrical circuit respectively with one end of each of said coils of wire, means for supporting said pair of contact devices within said non-magnetic tube whereby the devices are adapted to be engaged selectively by said magnetized bars in response to a predetermined change in the magnetic field adjacent thereto regardless of the azimuth position of said casing, a pair of contact elements in electrical engagement with the opposite end of each of said coils of wire respectively, and means including a pair of complementary contact devices in electrical engagement with said contact elements respectively for establishing external circuit connections to each of said coils of wire respectively when the non-magnetic tube is arranged within said casing.

13. In a magnetic responsive device of the character disclosed, the combination of a piovted magnetic element selectively responsive to changes in the magnetic field adjacent thereto, a casing for said device adapted to be laid on the bed of a body of water, means for pivotally mounting said magnetic element for rotation in a vertical plane within said casing, means including an adjustable magnet arranged with the axis thereof vertical and intersecting the axis of rotation of said magnetic element for yieldably setting the magnetic element in a predetermined position, a circuit closing member operatively connected to said magnetic element, a pair of fixed contact devices adapted to be engaged selectively by said circuit closing member as the magnetic element is rotated vertically in either direction from said predetermined position by a predetermined change in said magnetic field, an electrical cable extending from said casing and having a plurality of conductors in operative electrical connection with said pair of fixed contact devices and with said circuit closing member respectively, and means operatively connected to the conductors of said cable for indicating at a distance the operated condition of said contacts.

14. In a magnetic responsive device of the character disclosed, the combination of a pivoted magnetic element selectively responsive to changes in the magnetic field adjacent thereto, a casing for said device adapted to be laid on the bed of a body of water, means for pivotally mounting said magnetic element for rotation in a vertical plane within said casing, means including an adjustable magnet arranged with the axis thereof vertical and intersecting the axis of rotation of said magnetic element for yieldably setting the magnetic element in a predetermined position, a circuit closing member operatively connected to said magnetic element, a pair of fixed contact devices adapted to be engaged selectively by said circuit closing member as the magnetic element is rotated vertically in either direction from said predetermined position by a predetermined change in said magnetic field, an electrical cable extending from said casing and having a plurality of conductors in operative connection with said pair of fixed contact devices and with said circuit closing member respectively, means operatively connected to the conductors of said cable for indicating at a distance the operated condition of said contacts, and a line connected at intervals to said cable and at one end thereof to said casing for raising and lowering the device at will without injury to the cable.

15. In a magnetic responsive device of the character disclosed, the combination of a pivoted magnetic element selectively responsive to changes in the magnetic field adjacent thereto, a casing for said device adapted to be laid on the bed of a body of water, means for pivotally mounting said magnetic element for rotation in a vertical plane within said casing, means including an adjustable magnet arranged with the axis thereof vertical and intersecting the axis of rotation of said magnetic element for yieldably setting the magnetic element in a predetermined position, a circuit closing member operatively connected to said magnetic element, a pair of fixed contact devices adapted to be engaged selectively by said circuit closing member as the magnetic element is rotated vertically in either direction from said predetermined position by a predetermined change in said magnetic field, an electrical cable extending from said casing in watertight relation therewith and having a plurality of conductors in operative electrical connection with said pair of fixed contact devices and with said circuit closing member respectively, means operatively connected to the conductors of said cable for indicating at a distance the operated condition of said contacts, a line connected at intervals to said cable and at one end thereof to said casing for raising and lowering the device at will without injury to the cable, and an anchor secured to said line adjacent the casing for preventing movement of the casing as a result of movement of the length of cable intermediate the anchor and said indicating means.

JAMES B. GLENNON.
ALBERT H. SELLMAN.
WILSON R. MALTBY.